(12) United States Patent
Peeters

(10) Patent No.: US 10,336,012 B2
(45) Date of Patent: Jul. 2, 2019

(54) METHOD FOR FORMING OF A TUBULAR SEMI-FINISHED PRODUCT FROM FIBRE-REINFORCED PLASTIC MATERIAL

(71) Applicant: FIBERCORE IP B.V., Rotterdam (NL)

(72) Inventor: Johannes Hendricus Alphonsus Peeters, Rotterdam (NL)

(73) Assignee: FiberCore IP B.V., Rotterdam (NL)

( * ) Notice: Subject to any disclaimer, the term of this patent is extended or adjusted under 35 U.S.C. 154(b) by 0 days.

(21) Appl. No.: 15/531,085

(22) PCT Filed: Nov. 25, 2015

(86) PCT No.: PCT/NL2015/050823
§ 371 (c)(1),
(2) Date: May 26, 2017

(87) PCT Pub. No.: WO2016/085336
PCT Pub. Date: Jun. 2, 2016

(65) Prior Publication Data
US 2017/0320273 A1 Nov. 9, 2017

(30) Foreign Application Priority Data
Nov. 27, 2014 (NL) ..................................... 2013887

(51) Int. Cl.
*B29C 70/20* (2006.01)
*B29C 70/52* (2006.01)
(Continued)

(52) U.S. Cl.
CPC .............. *B29C 70/20* (2013.01); *B29C 53/48* (2013.01); *B29C 70/205* (2013.01);
(Continued)

(58) Field of Classification Search
CPC ....................................................... B29C 70/20
(Continued)

(56) References Cited

U.S. PATENT DOCUMENTS 3,965,942 A 6/1976 Hatch

FOREIGN PATENT DOCUMENTS

DE 1275279 B 8/1968
FR 2083365 A1 12/1971
(Continued)

OTHER PUBLICATIONS

Keller, "Recent all-composite and hybrid fibre-reinforced polymer bridges and buildings", Progress in Structural Engineering and Materials, 2001, vol. 3, pp. 132-140, XP002621123.
(Continued)

*Primary Examiner* — Brent T O'Hern
(74) *Attorney, Agent, or Firm* — N.V. Nederlandsch Octrooibureau; Catherine A. Shultz; Tamara C. Stegmann

(57) ABSTRACT

Disclosed is a method for producing a profiled semi-finished plastic product from flexible web material, including: providing a plurality of webs of flexible material, —continuously and simultaneously feeding the webs of material to and along a plurality of shaping pieces arranged next to each other, folding each web of material around a respective shaping piece to form a body and an edge strip which projects transversely with respect to the body,—causing the edge strips of different webs of material to at least partly cover each other, impregnating the webs of flexible material provided or the assembly of webs of material with folded-over edge strips covering each other with a hardenable unit, causing the hardenable unit to harden to form the profiled semi-finished plastic product, wherein open spaces remain between two neighbouring bodies and edge strips.

10 Claims, 6 Drawing Sheets

(51) Int. Cl.
*B29D 24/00* (2006.01)
*B29C 70/22* (2006.01)
*B29C 53/48* (2006.01)
*B29L 31/10* (2006.01)

(52) U.S. Cl.
CPC ............ *B29C 70/222* (2013.01); *B29C 70/52* (2013.01); *B29D 24/00* (2013.01); *B29L 2031/108* (2013.01)

(58) Field of Classification Search
USPC ........................................................ 428/121
See application file for complete search history.

(56) References Cited

FOREIGN PATENT DOCUMENTS

| | | | | |
|---|---|---|---|---|
| GB | 577790 | A * | 5/1946 | ........... B29C 66/438 |
| GB | 577790 | A | 5/1946 | |
| GB | 1166604 | A | 10/1969 | |
| NL | 7103486 | A | 9/1971 | |
| NL | 2001830 | C2 | 1/2010 | |
| WO | 2010/008293 | A2 | 1/2010 | |

OTHER PUBLICATIONS

International Search Report, dated May 11, 2016, from corresponding PCT application.

* cited by examiner

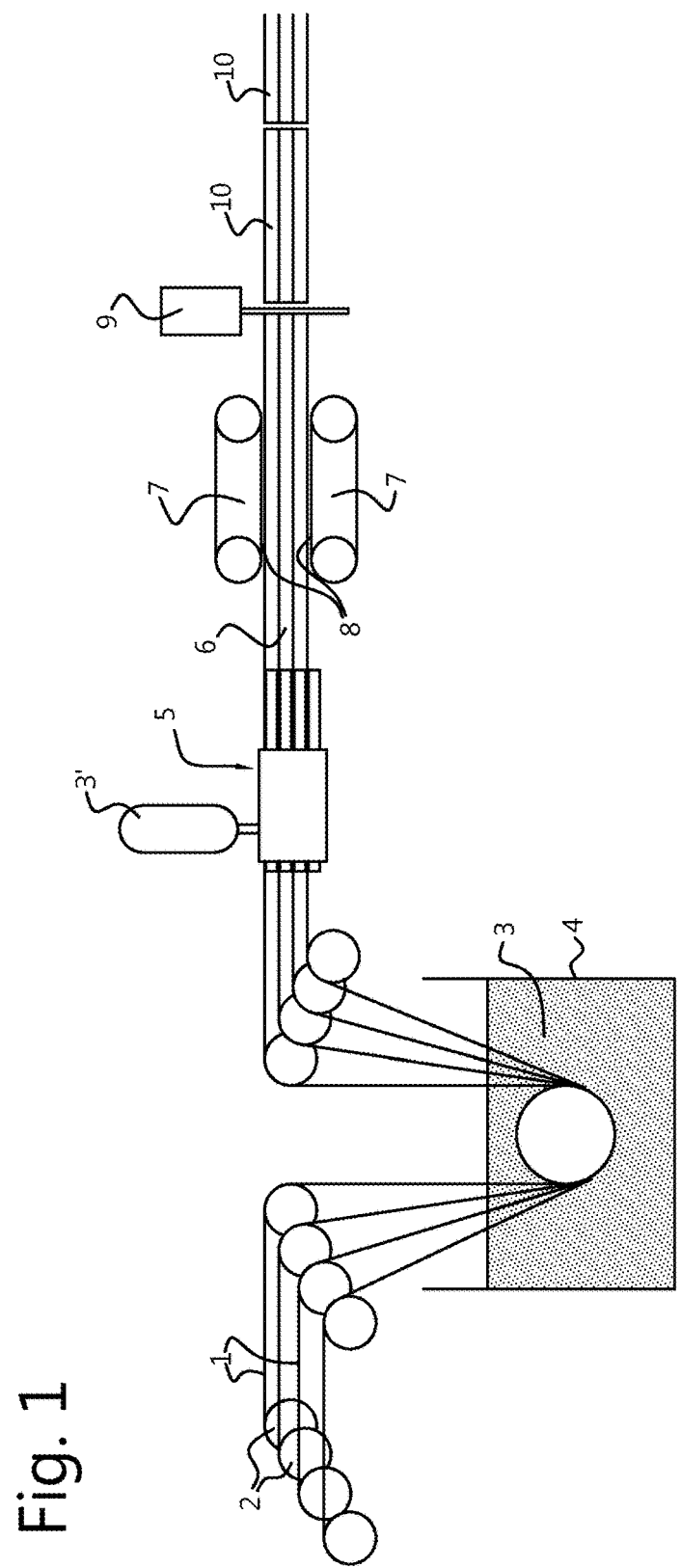

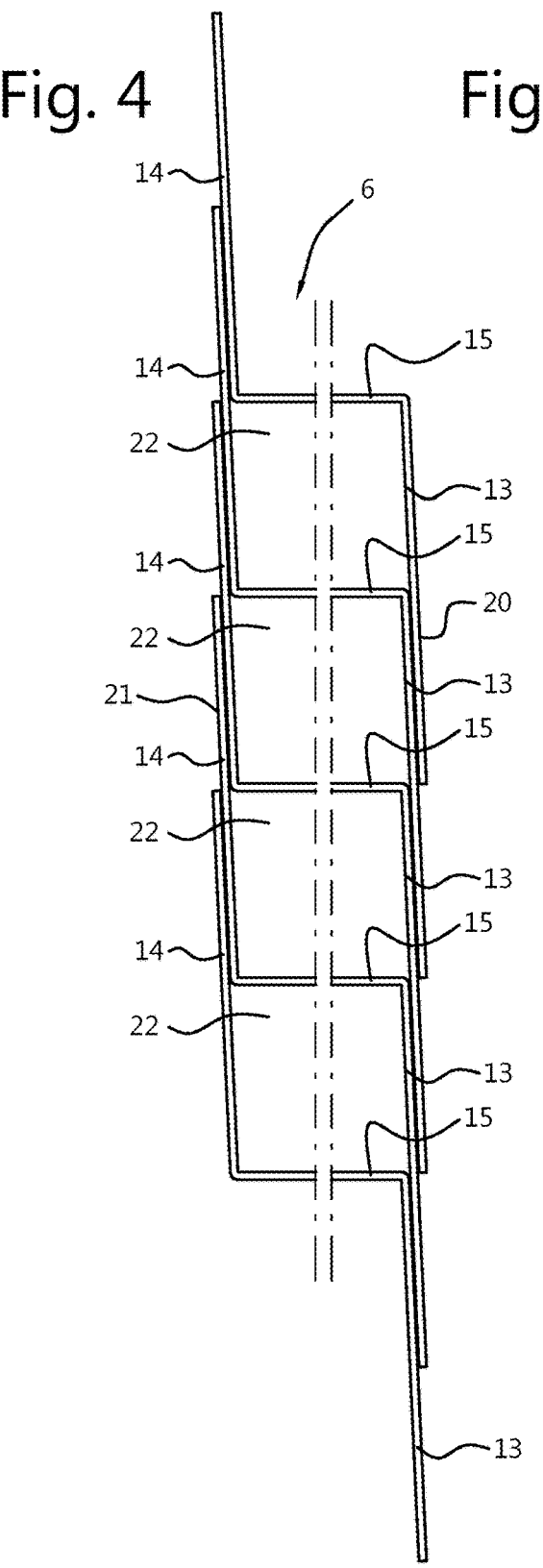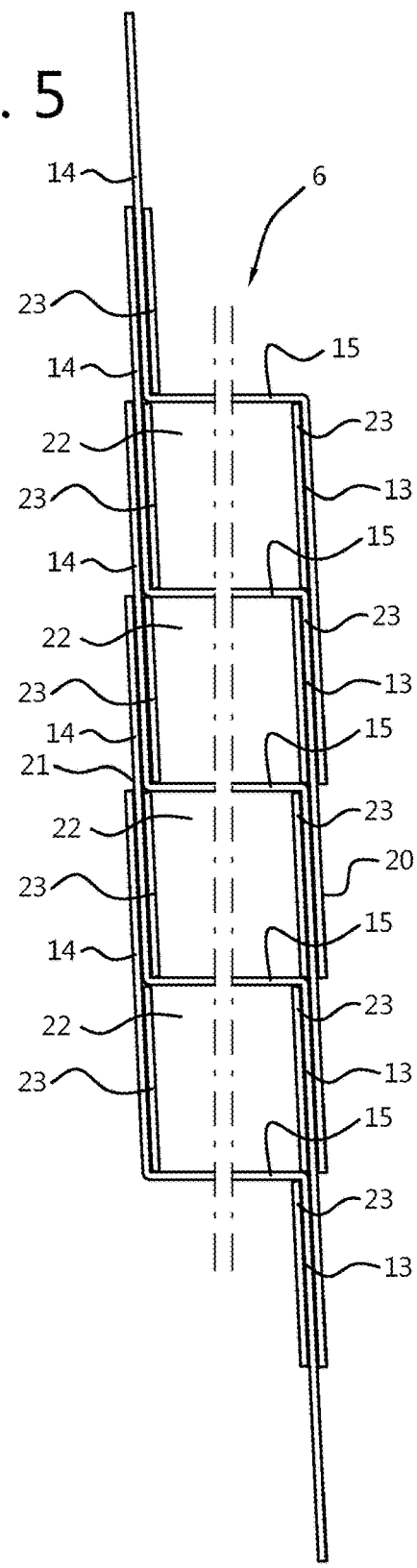

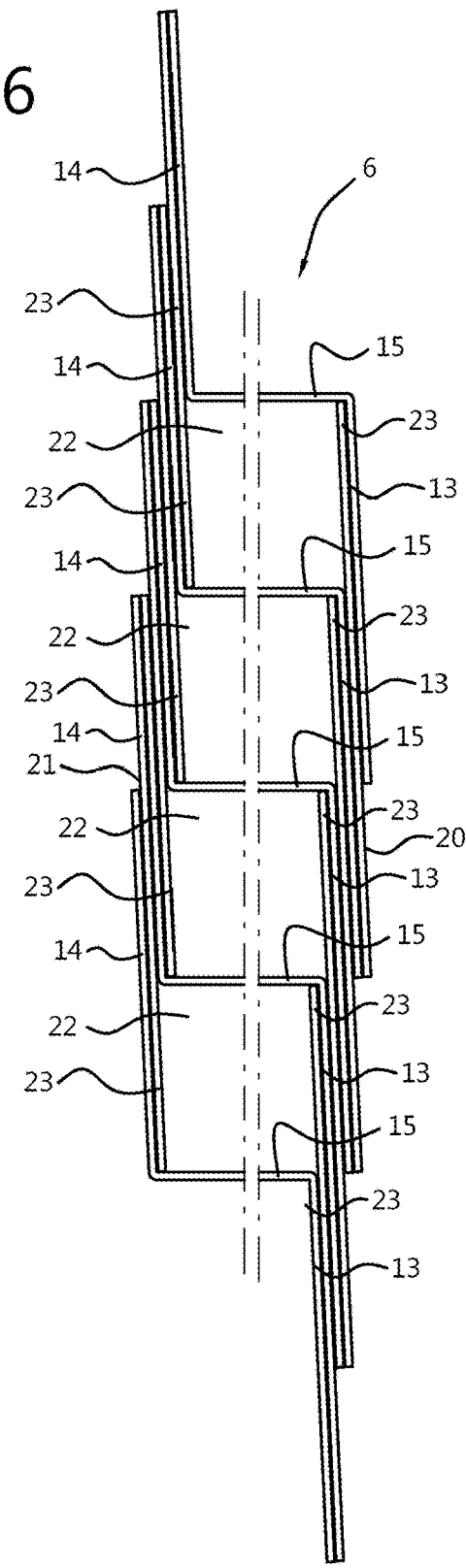

METHOD FOR FORMING OF A TUBULAR SEMI-FINISHED PRODUCT FROM FIBRE-REINFORCED PLASTIC MATERIAL

TECHNICAL FIELD

The invention relates to the field of producing plastic products from fibre-reinforced plastic material, such as webs made of glass fibres, carbon fibres and the like.

PRIOR ART

Usually, such webs of fibre-reinforced plastic material are arranged on a core, after which the combination is impregnated with a hardenable material, such as a resin. After the hardenable material has hardened, a product or semi-finished product is obtained, consisting of the webs of fibre-reinforced plastic material and cores, which may be used for many different purposes. Such a method and a product obtained thereby are known from patents NL-A-2001830 and WO2010/008293A2.

An example of such a product is a panel which is used as a bridge deck. In addition, such panels may be used, for example as a flood gate, for road plates, (gang) planks and the like. The cores may, for example, be made of a lightweight material, such as polyurethane foam. During production of the panel, the core material therefore serves as a shape around which the fibre-reinforced plastic material is arranged. In the finished product, the core material fills the space between the webs of fibre material and thus, to a certain degree, contributes to the dimensional stability and thus to the load capacity of the product.

However, it is not always necessary or even desirable for the space between the webs of fibre material to be filled with core material. It should be considered that the hardened fibre-reinforced plastic material in the finished product already has such a high strength and stiffness that additional measures, such as the presence of cores, are not always required. In addition, it may be desirable to leave the space between the webs of fibre material open, such as for leading lines through. A method for producing such a product without the use of cores is known, and is known as the pultrusion technology.

BRIEF DESCRIPTION OF THE INVENTION

It is therefore an object of the invention to provide such a semi-finished product which can be produced without having to incorporate cores. This object is achieved by a method for producing a profiled semi-finished plastic product from flexible web material, comprising the following steps:
  providing a plurality of webs of flexible material;
  continuously and simultaneously feeding the webs of material to and along several shaping pieces arranged next to each other;
  folding each web of material around a respective shaping piece to form a body and an edge strip which projects transversely with respect to the body;
  causing the edge strips of different webs of material to at least partly cover each other;
  impregnating the provided webs of flexible material or the assembly of webs of material with folded over edge strips covering each other with a hardenable means, and
  causing the hardenable means to harden to form the profiled plastic semi-finished product.

During forming, open spaces may remain between two neighbouring bodies and edge strips in the formed profiled semi-finished plastic product. Impregnating the webs of material may be effected before, during or after forming the assembly of webs of material.

With the method according to the invention, in relation to the formation of various webs of material, shaping pieces are used which form part of a stationary shaping device. This means that the webs of material and the tubes produced therefrom are guided along the shaping pieces, without cores having to be used inside said material. The shaping pieces replace the traditional cores, which means that open spaces remain in the finished semi-finished product or product at those positions where cores would be present in the traditional product. As has already been mentioned, the hardened web of material may, however, already have such mechanical properties that the strength and stiffness of the product which is thus formed are sufficiently great.

According to an embodiment, gaps are formed between the shaping pieces. In this embodiment, the continuous and simultaneous feeding of the webs of material to and along the shaping pieces also comprises continuously and simultaneously feeding the webs of material via the gaps to and along the plurality of shaping pieces which are arranged next to each other.

According to a further embodiment, the continuous and simultaneous feeding of the webs of material to and along the shaping pieces also comprises allowing the edge strips to project with respect to the shaping pieces on either side of the gaps, wherein the body is situated in the area of the gaps and between the edge strips.

Because the shaping pieces may have any desired shape, it is thus possible to produce differently shaped products. In this case, it is important that the different webs of material of which the product consists are connected to each other in a reliable manner. This may be achieved by means of the following steps:
  folding the webs of material around a side of the respective shaping piece to form an edge strip,
  folding the webs of material around another side of the respective shaping piece to form another edge strip,
  causing the edge strips at said one side of the shaping pieces to cover each other,
  causing the edge strips on said other side of the shaping pieces to cover each other.

In this embodiment, the edge strips of the webs of material cover each other. Preferably, the largest transverse dimension of the shaping pieces is to this end smaller than the width of a web of material. Due to the fact that the edge strips are impregnated, a very strong connection between the webs of material is achieved when hardening the impregnating means, such as a resin. This connection is able to absorb great shearing forces, so that the finished product is readily able to withstand flexure and torsion. In this context, it is preferably provided that the edge strips are formed on opposite sides of the respective shaping pieces, so that a closed cross section is obtained. Thus, a torsion box is obtained which is readily able to withstand flexure and torsion.

The edge strips may be oriented in different ways. According to a first option, the edge strips of a web of material project in opposite directions with respect to the associated body. This may be achieved, for example, by the step of folding the edge strips by using a shaping element which is moved according to a path according to the common contour in peripheral direction around the shaping pieces. This shaping element may be, for example, a roller, the axis of which is directed in the same direction as the longitudinal direction of the shaping pieces.

Preferably, the dimension of the edge strips in the transverse direction is equal. The edge strips may cover each other in the way roof tiles do. Such a layering of the edge strips in the manner of roof tiles has the advantage that the structure is readily able to withstand high local loads, such as point loads. In addition, with such a layering in the manner of roof tiles, the resistance to delamination is high. Furthermore, the shearing force between the body and a skin formed by the edge strips is very high due to continuity in the fibre reinforcement. The edge strips may have such a width that more than two edge strips cover each other in the manner of roof tiles, for example three or four edge strips, in such a way that a cluster is formed, consisting of three or four or even more layers respectively. In this case, the strength and resistance to delamination and shearing between the body and the skin increase proportionally.

The method may furthermore comprise the following steps:
  providing at least one auxiliary strip;
  fitting the auxiliary strip so that it contacts at least one edge strip;
  impregnating the at least one auxiliary strip together with the assembly made of webs of material comprising folded edge strips covering each other with a hardenable means.

The auxiliary strip may extend across the entire transverse dimension of an edge strip, but it is also possible to use an auxiliary strip which is narrower or wider. In the latter case, the edge strip may extend across two or more successive edge strips. The auxiliary strips impart greater strength and/or stiffness to the resulting end product. This may be achieved, in particular, if the auxiliary strips comprise fibres having a certain desired orientation, such as unidirectional fibres extending in the longitudinal direction. In this way, it is possible to influence the strength and stiffness of the finished product in the desired manner.

The method may furthermore comprise the step of separating the completed semi-finished product into several end products, for example by providing a cut in the transverse direction of the semi-finished product.

The invention furthermore relates to a profiled product or semi-finished product produced by means of the described method. This product or semi-finished product comprises several bodies extending next to each other in the longitudinal direction and two mutually opposite surfaces which are formed by the edge strips, which edge strips are transverse to the bodies, wherein the spaces which are in each case defined by two neighbouring bodies and surfaces are open and/or hollow. These spaces may, for example, have a triangular, rectangular, parallelogram-shaped or square cross section. The product may be configured as a panel, beam or mast.

The invention also relates to an installation for carrying out said method, comprising a frame, a shaping device suspended from the frame and provided with a number of shaping pieces positioned next to each other and mutually parallel, a folding element which is displaceable along a guide which extends in a plane transverse to the longitudinal direction of the shaping pieces of the shaping device, an impregnation station, as well as a hardening device, such as for example a heating station. Instead of applying the resin in an impregnation station which is situated upstream of the mould containing the shaping piece, the resin may also be injected directly into the mould. By moving the folding element in a direction around the shaping elements, the edge strips which project laterally with respect to the shaping parts can be folded against the shaping pieces and pressed together.

The shaping pieces may be configured in many different ways. They may have a prismatic shape, in which case all cross sections are identical in the longitudinal direction of a shaping piece. However, it is also possible to attribute the cross sections of a shaping piece varying shapes in the longitudinal direction, aimed at gradually shaping the webs of material into the ultimately desired form.

BRIEF DESCRIPTION OF THE FIGURES

Below, exemplary embodiments of the invention will be described, solely by way of example and with reference to the accompanying diagrammatic drawings, in which identical parts are denoted by the same reference numerals.

FIG. 1 shows a principle view of a device for carrying out the method according to the invention.

FIG. 4 shows a part of the completed semi-finished product obtained according to FIGS. 2a and 3a-c.

FIG. 5 shows a part of the completed semi-finished product obtained according to FIG. 2b.

FIG. 6 shows a part of a variant of the completed semi-finished product.

Figure 2A:
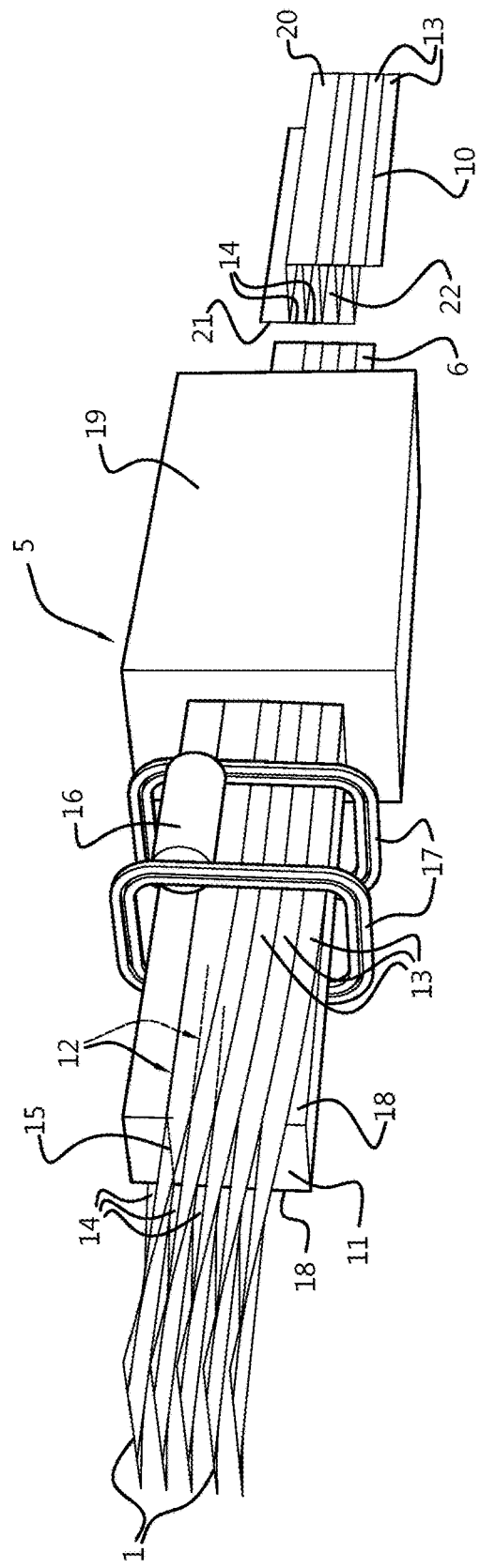
FIG. 2a shows a view in perspective of a first embodiment of the device.

The drawings are only intended for illustrative purposes, and do not serve to limit the scope of protection which is defined by the claims.

DESCRIPTION OF EMBODIMENTS

The principle view illustrated in FIG. 1 shows the different steps related to the method according to the invention. According to this view, the direction of the production process is from the left to the right in FIG. 1. In this case, a number of webs of flexible fibre-reinforced material 1 are used, originating from the rollers 2. The webs of material 1 are impregnated with a resin 3 (or another suitable impregnating means), which is situated in the container 4. Subsequently, they are passed through the shaping device 5, in which the webs of material are given the desired shape. When they exit the shaping device 5, the webs of material 1 have been hardened and shaped to form a coherent semi-finished product 6. The inner parts 8 of the endless conveyor belts 7 engage with this semi-finished product, in such a way that a driving action is achieved on the webs of fibre-reinforced material 1 which are still connected thereto. By means of the sawing device 9, the finished products 10 are finally sawn off from the semi-finished product 6.

Although FIG. 1 shows that impregnating can take place in the container 4, impregnating may alternatively take place in the shaping device 5 by means of the injection device 3'.

In the view in perspective from FIG. 2a, the shaping device is illustrated in more detail. The shaping device 5 contains a number of shaping pieces 11 which are arranged one above the other. In the illustrated exemplary embodiment, each of these shaping pieces 11 has the shape of a prismatic beam with a rectangular cross section. A small distance is left open each time between the shaping pieces 11 to form a gap 12. The webs of material 1 are fed to these gaps 12, due to the pulling power which is exerted by the inner parts 8 of the conveyor belts 7 on the semi-finished product 6 made from these webs of material 1.

Because the width of each web of material 1 is greater than the width of the gap 12 and the width of the shaping pieces 11, and each of the webs of material 1 is supplied to the gaps 12 in a precisely centred manner, edge strips 13, 14 project from the gaps 12 on either side. The portion of the webs of material 1 which is situated in the region of the gaps 12 between both edge strips 13, 14 forms a so-called body 15.

Figure 2B:
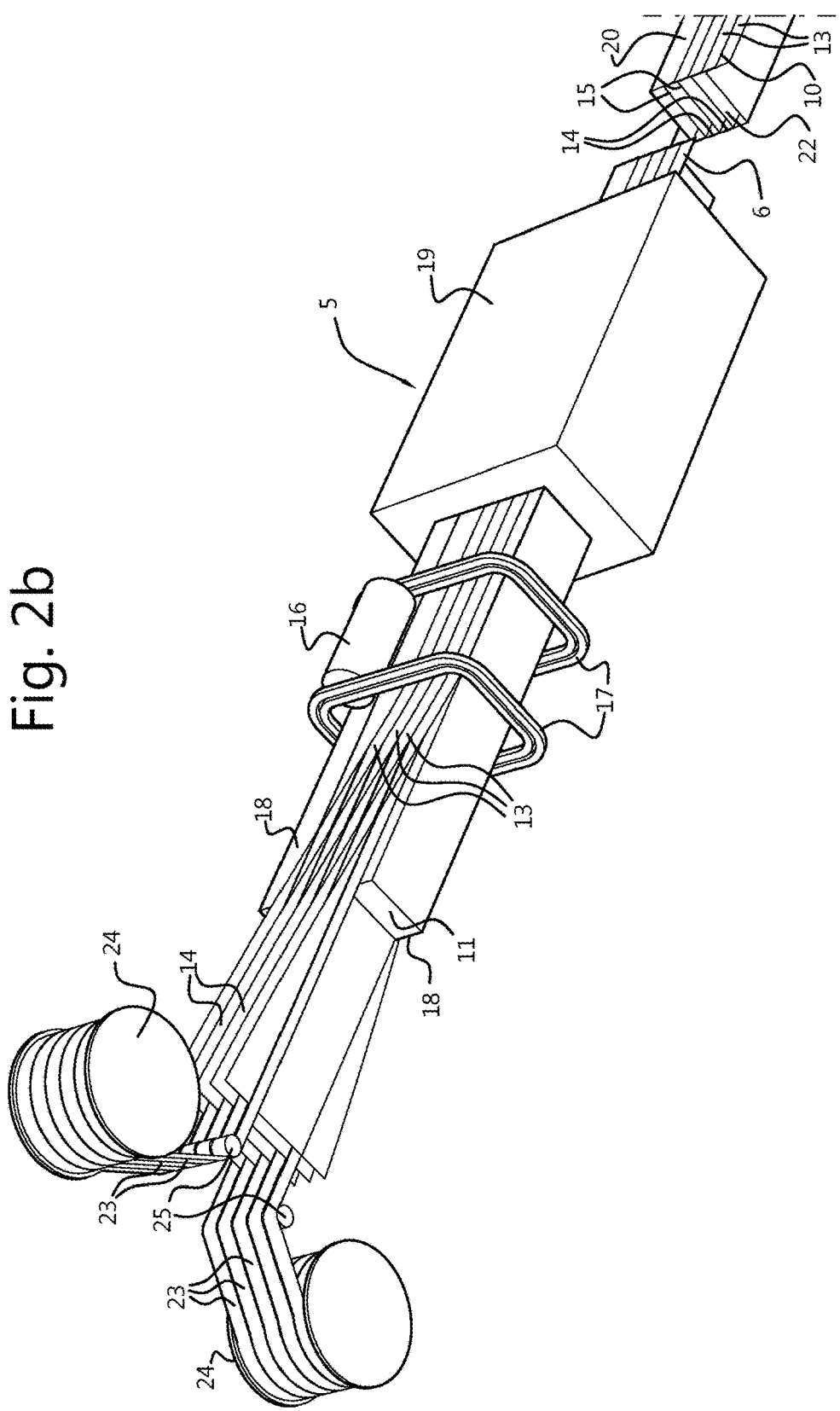
FIG. 2b shows a view in perspective of a second embodiment of the device.

In the shaping device of FIG. 2b, auxiliary strips 23 may also be supplied between in each case two overlapping edge strips 13 or 14. The auxiliary strips 23 are taken from the reels 24, and deflected via guides 25 in such a manner that they are arranged next to and between two successive edge strips 13 or 14. Preferably, the auxiliary strips have a unidirectional fibre orientation, so that the strength and stiffness properties of the product can be influenced.

Figure 3A:
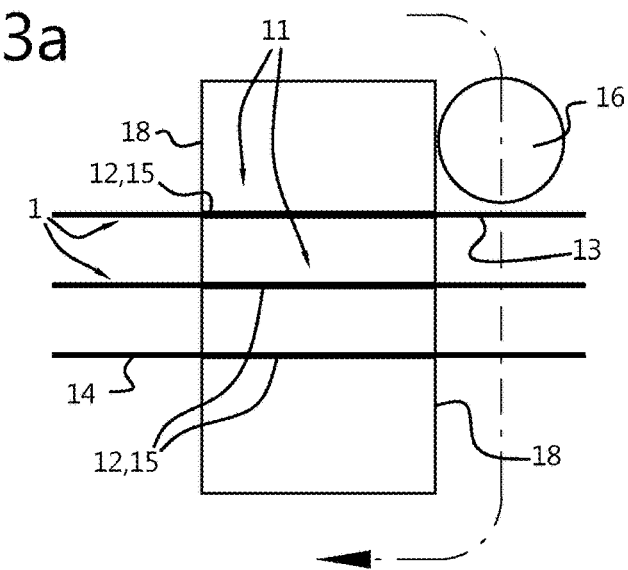
FIGS. 3a-c show different stages of the shaping of a semi-finished product in the device.
Figure 3B:
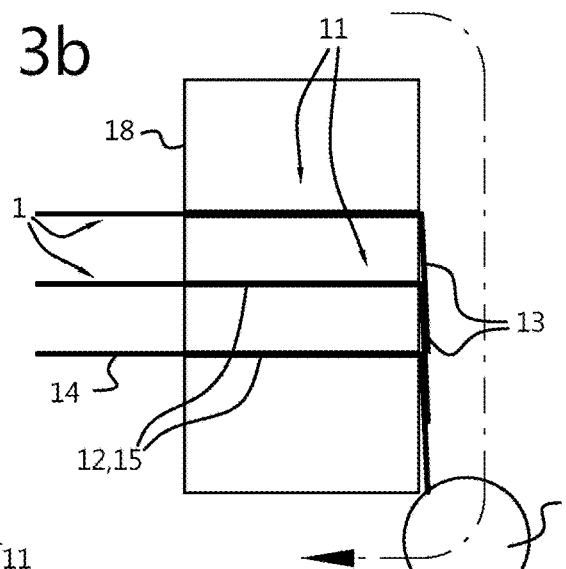
Figure 3C:
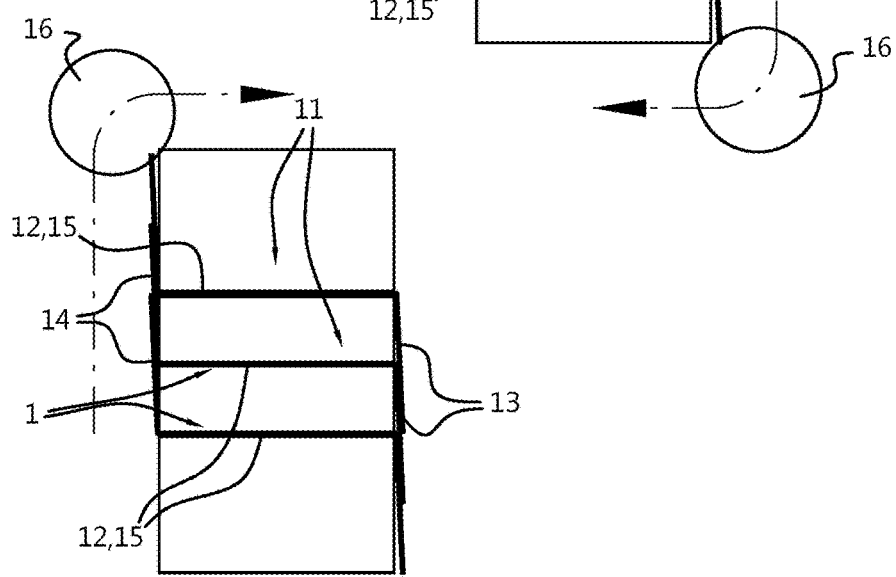

As is illustrated in FIGS. 2, 3a and 3b, an edge strip 13 which is on the right-hand side, viewed in the conveying direction, is folded downwards. Subsequently, as is illustrated in FIG. 3c, the opposite edge strip 14 is folded upwards. The illustrated orientation of the edge strips 13, 14 can be obtained in a simple manner by means of the folding element 16 which is configured as a roller. This folding element 16 is displaceable along the path formed by the guides 17. This path runs around the series of shaping pieces 11 in such a manner that the roller 16 touches the shaping pieces 11, in particular the sides 18 thereof, or is at a small distance from these shaping pieces 11. Of course, it is also possible for the edge strips on the right-hand side to point upwards and those on the left-hand side to point downwards, or for both to point upwards or for both to point downwards.

In this folded position, the edge strips 13 cover each other in the manner of roof tiles; the same applies to the edge strips 14. In this position, the unit comprising folded webs of material 1 is fed to the hardening device 19, for example a heating device or other device by means of which the impregnating means can be hardened. There, the resin with which the webs of material 1 have been impregnated is hardened. The edge strips 13 and 14, respectively, covering each other in the manner of roof tiles are in this case securely connected to each other, in such a way that a self-supporting unit is produced in the form of the semi-finished product 6 which ultimately emerges from the hardening device 19, again on account of the driving action of the endless belts 7. A portion of the resulting semi-finished product is shown in FIG. 4.

When auxiliary strips 23 are used, these come to lie between in each case two successive edge strips 13 or 14. The auxiliary strips 23 may be as wide as an edge strip, but narrower or wider embodiments are also possible. A section of this semi-finished product is shown in FIG. 5.

As has been described above, a product 10 can eventually be sawn off from the semi-finished product 6 by means of the sawing device 9. In this way, a continuous way of producing products 10 is achieved. As illustrated in FIGS. 2a, 2b, 4, 5 and 6, said product 10 has parallel surfaces 20, 21 which consist of edge strips 13 and 14, respectively, which overlap in the manner of roof tiles. The bodies 15 extend between these surfaces 20, 21, with hollow spaces 22 being present between these bodies 15. Such a product is highly suitable for use as a panel for many different purposes. By way of example, a bridge deck, flood gate and the like are mentioned. It is also suitable as a strong sheet material for containers and modular construction and the like. The tile-like overlapping of the edge strips 13 of which the surfaces 20, 21 are made has a very high resistance to local loads and is very tolerant with regard to, for example, local damage, such as can be caused by traffic which drives across a bridge deck formed in this manner.

It will be clear that the above-described embodiments have only been described by way of example and not in any limiting sense, and that different modifications and adaptations are possible without departing from the scope of the invention and that the scope is only defined by the attached claims.

LIST OF REFERENCE NUMERALS

1 Web of fibre-reinforced material
2 Reel
3 Impregnating means (e.g. resin bath)
3' Injection device
4 Container
5 Shaping device
6 Semi-finished product
7 Conveyor belt
8 inner part of conveyor belt
9 Co-rotating sawing device
10 Finished product
11 Shaping piece
12 Gap between shaping pieces
13 Edge strip
14 Further edge strip
15 Body
16 Folding element
17 Guide folding element
18 Side of shaping piece
19 Hardening device (e.g. heating device)
20 Product surface
21 Further product surface
22 Cavity in product
23 Auxiliary strip
24 Reel
25 Guide

The invention claimed is:

1. A method for producing a profiled semi-finished plastic product from web material, comprising:
    providing a plurality of webs of material;
    continuously and simultaneously feeding the plurality of webs of material to and along a plurality of shaping pieces arranged next to each other, having a greatest transverse dimension which is smaller than a width of the plurality of webs of material;
    folding each of the plurality of webs of material around a shaping piece to form a body and an edge strip which projects transversely with respect to the body;
    causing the edge strip of each of the plurality of webs of material to at least partly cover each other;
    impregnating the plurality of webs of material with folded-over edge strips covering each other with a hardenable means;
    causing the hardenable means to harden to form a profiled semi-finished plastic product, in such a manner that hollow or open spaces remain, each defined between two neighbouring bodies and edge strips in the profiled semi-finished plastic product.

2. The method according to claim 1, wherein gaps are formed between the shaping pieces and wherein the continuous and simultaneous feeding of the plurality of webs of material to and along the shaping pieces comprises:

continuously and simultaneously feeding the plurality of webs of material via the gaps to and along the plurality of shaping pieces which are arranged next to each other.

3. The method according to claim 2, wherein the continuous and simultaneous feeding of the plurality webs of material to and along the shaping pieces comprises:
allowing the edge strips to project with respect to the shaping pieces on either side of the gaps, in which case the body is situated in the area of the gaps and between the edge strips.

4. The method according to claim 1, comprising:
folding each of the plurality of webs of material around a first side of the respective shaping piece to form a plurality of first edge strips;
folding each of the plurality of webs of material around a second side of the respective shaping piece to form a plurality of second edge strips;
causing the plurality of first edge strips on the first side of the respective shaping piece to cover each other;
causing the plurality of second edge strips on the second side of the respective shaping pieces to cover each other.

5. The method according to claim 4, comprising forming the edge strip on opposite sides of the respective shaping piece.

6. The method according to claim 5, comprising
causing the edge strip of the plurality of webs of material to project in opposite directions with respect to the body.

7. The method according to claim 6, comprising
folding the edge strip by using a shaping element which moves in a peripheral direction around a common contour defined by the shaping pieces, wherein an axis of the shaping element is directed in a same direction as a longitudinal direction of the shaping pieces.

8. The method according to claim 1, wherein the edge strips cover each other in a manner of roof tiles.

9. The method according to claim 1, comprising:
providing at least one auxiliary strip;
fitting the at least one auxiliary strip so that it contacts at least one edge strip, and
impregnating the at least one auxiliary strip together with the plurality of webs of material comprising folded edge strips covering each other with a hardenable means.

10. The method according to claim 1, comprising:
separating a completed semi-finished product into several end products.

* * * * *